DUAL OUTPUT POWER SUPPLY FOR TRANSISTOR CIRCUITS

Filed Aug. 9, 1962 5 Sheets-Sheet 1

INVENTOR.
ALFONS A. TUSZYNSKI
BY
Bean, Brooks, Buckley + Bean
ATTORNEYS

DUAL OUTPUT POWER SUPPLY FOR TRANSISTOR CIRCUITS

Filed Aug. 9, 1962 5 Sheets-Sheet 2

INVENTOR.
ALFONS A. TUSZYNSKI
BY
Beau, Brooks, Buckley & Beau
ATTORNEYS

DUAL OUTPUT POWER SUPPLY FOR TRANSISTOR CIRCUITS

Filed Aug. 9, 1962

INVENTOR.
ALFONS A. TUSZYNSKI
BY
Bean, Brooks, Buckley & Bean
ATTORNEYS

Sept. 13, 1966 A. A. TUSZYNSKI 3,273,042

DUAL OUTPUT POWER SUPPLY FOR TRANSISTOR CIRCUITS

Filed Aug. 9, 1962 5 Sheets-Sheet 4

INVENTOR.
ALFONS A. TUSZYNSKI

BY

Bean, Brooks, Buckley + Bean
ATTORNEYS

DUAL OUTPUT POWER SUPPLY FOR TRANSISTOR CIRCUITS

Filed Aug. 9, 1962 5 Sheets-Sheet 5

INVENTOR.

ALFONS A. TUSZYNSKI

BY

Bean, Brooks, Buckley & Bean.

ATTORNEYS

United States Patent Office 3,273,042
Patented Sept. 13, 1966

3,273,042
DUAL OUTPUT POWER SUPPLY FOR TRANSISTOR CIRCUITS

Alfons A. Tuszynski, Buffalo, N.Y., assignor, by mesne assignments, to Esterline-Angus Instrument Company, Inc., Indianapolis, Ind., a corporation of Delaware Filed Aug. 9, 1962, Ser. No. 215,917
6 Claims. (Cl. 321—16)

This invention relates in general to power supply circuits and, in particular, relates to a dual output power supply especially for transistor circuits.

Of primary concern in connection with this invention is the provision of a unitary power supply having a main supply and a secondary supply which splits the voltage of the main supply without significant power loss. Specifically, this objective is obtained by the expedient of a stabilized main supply and a pair of semiconductors arranged in complementary symmetry across such main supply, the complementary pair being controlled to obtain the requisite voltage at the secondary supply point.

Another object of this invention is to provide a power supply system as aforesaid which is characterized by economy of components.

A further object of this invention resides in the provision of a dual output power supply having a main supply control element provided with simplified associated circuitry for effecting stabilization of the main supply, including means for providing an auxiliary voltage which is of greater potential than the main supply voltage.

Another object of this invention is to provide a dual output power supply which involves a novel combination of control elements and difference amplifiers, the arrangement being such as to realize an economy of components while yet establishing effectively stabilized main and secondary voltage supplies.

Still another object of this invention resides in a novel arrangement of complementary pairs of semiconductors in a system as aforesaid so that the bias currents of a complementary pair of semiconductors acting as a secondary voltage supply control element, may be maintained within reasonable limits.

Other objects and advantages of the invention will appear from the description hereinbelow and the accompanying drawing wherein.

Figure 1:
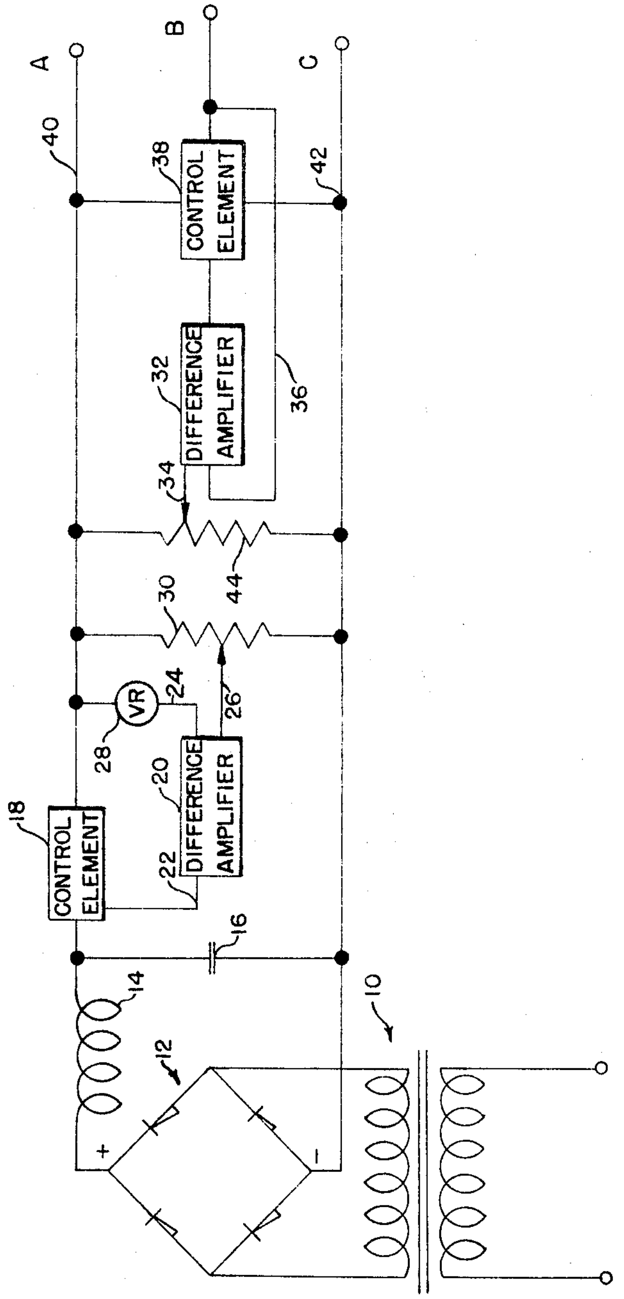
FIG. 1 is a diagrammatic view illustrating the principles of this invention.

As shown in FIG. 1, a suitable transformer 10 and associated full wave rectifier 12 may be used, the output of which is applied to a filter circuit which, as shown, may comprise the inductance element 14 and associated capacitor 16. A suitable control element 18 is connected in series with the output of the filter circuit and by controlling this element 18 from the differential amplifier 20 whose output, at conductor 22, is a function of comparison between the voltage at the conductor 24 and the voltage at the conductor 26, the difference in potential between points A and C may be stabilized. This effect is achieved by fixing the voltage at conductor 24 by means of a voltage reference element 28. Also, by allowing manual selection of the voltage at conductor 26, as by the potentiometer 30 as shown, the magnitude of the stabilized potential between points A and C may be varied as desired.

In association with the above described circuitry, a second difference amplifier 32 is used to compare the difference in potential between conductors 34 and 36, the former of which is derived from the stabilized potential existing between points A and C and the latter of which is derived from the potential existing at the third output point B, as shown. A control element 38 is connected between the conductors 40 and 42 and the output of the differential amplifier 32 is used to control this element to stabilize the output voltage at point B. By suitable manual selection of the voltage at conductor 34, as by the potentiometer 44, the level of the output at point B may be varied as desired.

Thus, with the basic system as shown, a stabilized dual output power supply of simple configuration is obtained. Further, it will be noted that by adjusting potentiometer 30, the sum of the voltage at points A and B may be varied without affecting the ratio of potentials existing between points A and B and points B and C. That is, ascribing voltages $Va$, $Vb$ and $Vc$ to points A, B and C respectively, adjustment of potentiometer 30 will alter the sum of $|Va|+|Vc|$ without altering the numerical value of the ratio $$\frac{Va-Vb}{Vc-Vb}$$

Similarly, it will be noted that adjustment of potentiometer 44 will vary the ratio $$\frac{Va-Vb}{Vc-Vb}$$

without altering the sum $|Va|+|Vc|$.

Figure 2:
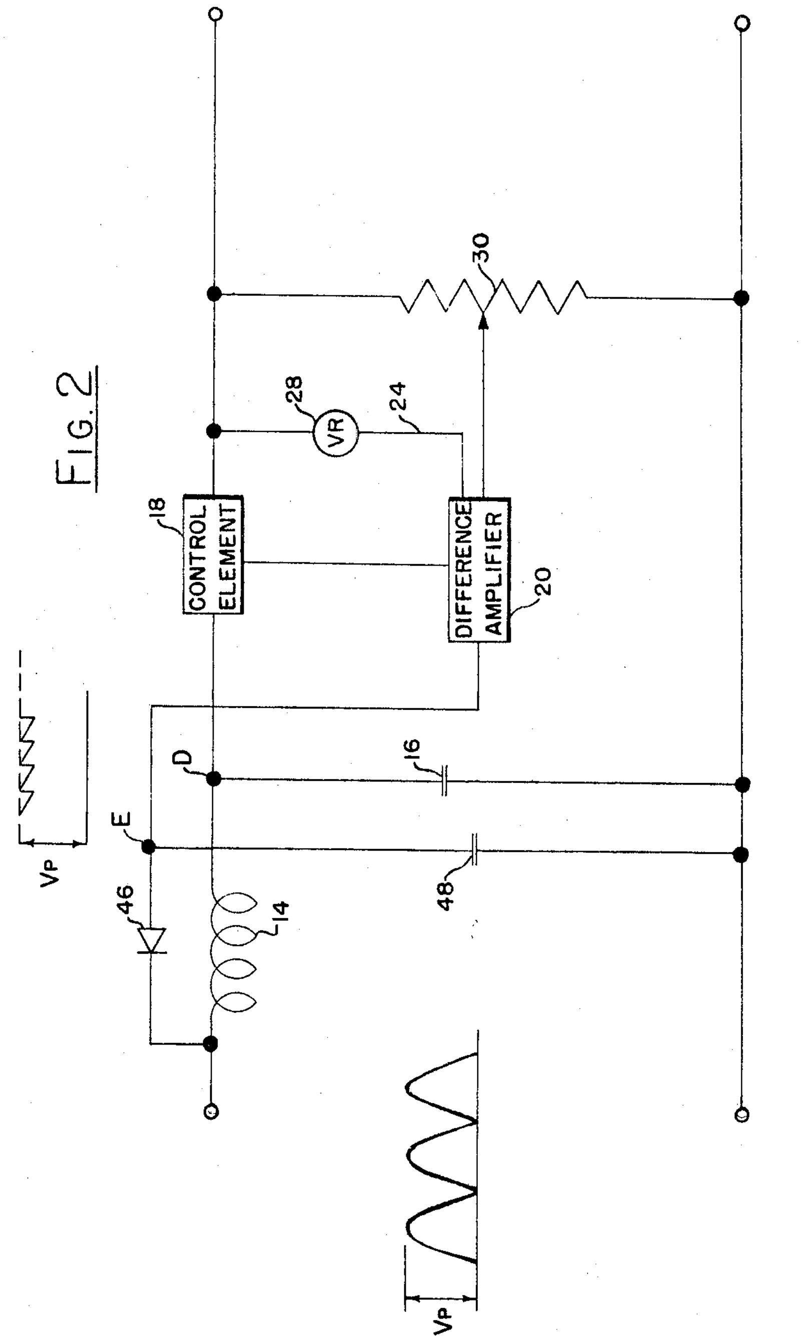
FIG. 2 is a view showing the manner employed to obtain a reference potential input for the first difference amplifier which is greater than that applied to the control element.

As a refinement of the circuitry as shown in FIG. 1, a supply for the differential amplifier 20 may be employed as shown in FIG. 2. Using the LC filter 14, 16 with the input voltage having a peak voltage $V_p$ as shown, the voltage at point D may be shown to be $$\frac{2}{\pi}V_p$$

It is desirable to have the supply for the difference amplifier, at point E, at a potential which is higher than that at point D. This may be accomplished in simple fashion by utilizing a diode 46 connected ahead of the inductor 14 and an associated capacitor 48 to produce an output as shown, whose average value approaches the value $V_p$.

Figure 3:
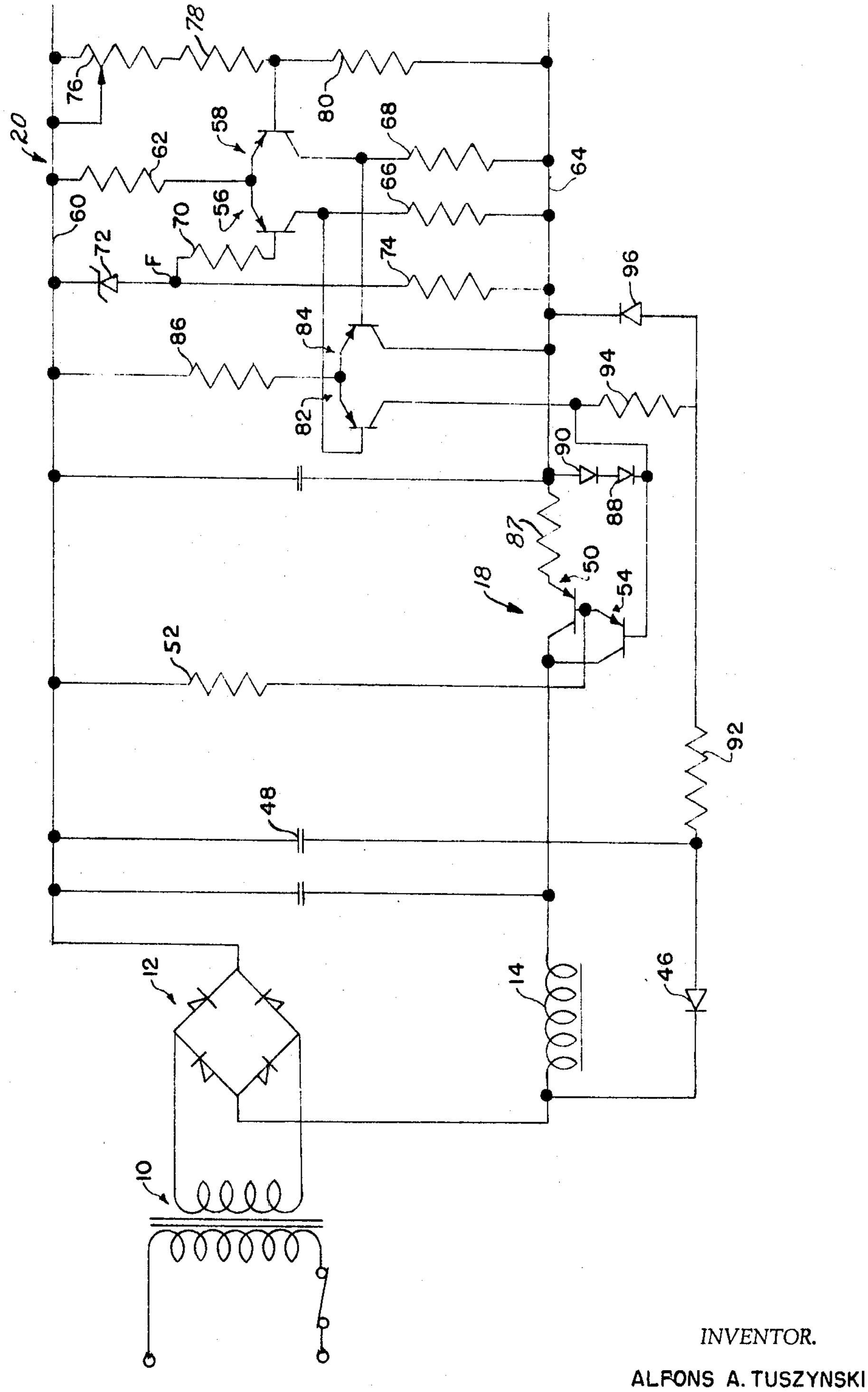
FIG. 3 is a schematic of the main supply portion of the invention.

The circuitry thus far described consists in a general combination providing a stabilized dual output, having in particular the characteristics set forth, and an improved voltage source for the first difference amplifier 20. To illustrate a preferred embodiment for the stabilized supply between points A and C of FIG. 1, reference is had now to FIG. 3. In this figure, aside from those elements already described in detail, it will be seen that the control element may take the form of the transistors 50 and 54 connected as shown. Bias current, necessary to assure conduction of the transistor 54 at low load current, is drawn through the resistor 52. The two semiconductors 50 and 54 form the control assembly and the latter is under the control of the difference amplifier 20 and has direct control of element 50.

The difference amplifier also includes a pair of transistors 56 and 58 having their emitters connected to the conductor 60 through dropping resistor 62 and their respective collectors connected to the conductor 64 through the dropping resistors 66 and 68. The base of the transistor 56 is connected through a resistor 70 to point F whose potential is fixed by means of the voltage reference diode such as zener diode 72, corresponding to element 28 in FIG. 1.

The base electrode of the transistor 58 is biased by means of a voltage divider chain which consists of the variable resistor 76 and fixed resistors 78 and 80. Thus, while the base electrode of transistor 56 is at fixed potential, the bias on the base electrode of transistor 58 is dependent upon both the adjustment of variable resistor 76 and the difference in potential existing between conductors 60 and 64. The outputs of these two transistors across their respective loads 66 and 68 are proportional to the difference between the fixed potential at point F and the potential at the base of the transistor 58, the latter potential being a function of the difference in potential between conductors 60 and 64.

The voltages across the resistors 66 and 68 are used to bias the base electrodes of another transistor pair 82 and 84 sharing the common resistor 86 connected between their emitter electrodes and conductor 60. The collector of transistor 84 is connected directly to conductor 64 while the collector of transistor 82 is connected to a point of reference potential through the voltage divider 94. A point common to resistor 94 and the collector electrode of transistor 82 is connected to the base electrode of the transistor 54 to affect the bias on this transistor under the action of the difference amplifier. At the same time, feedback for protection of the power supply from excessive loading is obtained by means of the emitter resistor 87 and associated diodes 88 and 90 which connect between conductor 64 and the base electrode of the transistor 54.

As aforesaid, the resistor 94 is connected to a point of auxiliary potential, and this auxiliary potential is obtained by means of the diode 96 which shunts between the output of elements 46 and 48, through dropping resistor 92, and the conductor 64.

From the description of the circuit thus far, it will be appreciated that the main supply output across conductors 60 and 64 may be varied by adjustment of the variable resistor 76. For example, if the value of resistor 76 is increased, the base electrode of the transistor 58 will be made more negative, causing such transistor to be rendered more conductive to thereby drive the base electrode of transistor 84 more positive. At the same time, current flow through the transistor 56 will be reduced due to the voltage drop across the common emitter resistor 62 caused by the increased conductivity of transistor 58. Consequently, the base of transistor 82 will be driven more negative.

The transistors 82 and 84 effectively isolate the collector outputs of the first pair of transistors and, for the condition stated, the transistor 82 will be made more conductive while the transistor 84 will be made less conductive. Therefore, the voltage drop across the resistor 94 will be greater and the base electrode of transistor 54 will therefore be made more positive, reducing the current in the transistor 54 and thereby driving the control element 50 less conductive. From a consideration of the two control transistors 50 and 54, the desirability for the diode 46 and capacitor 48 becomes more evident. That is, since the potential at the base electrode of the transistor 50 must be negative with respect to its emitter electrode and the base and emitter electrodes of the transistors 50 and 54 are at the same potential, the base electrode of the transistor 54 must be more negative yet, hence the desirability for the greater negative potential afforded by the elements 46 and 48.

Figure 4:
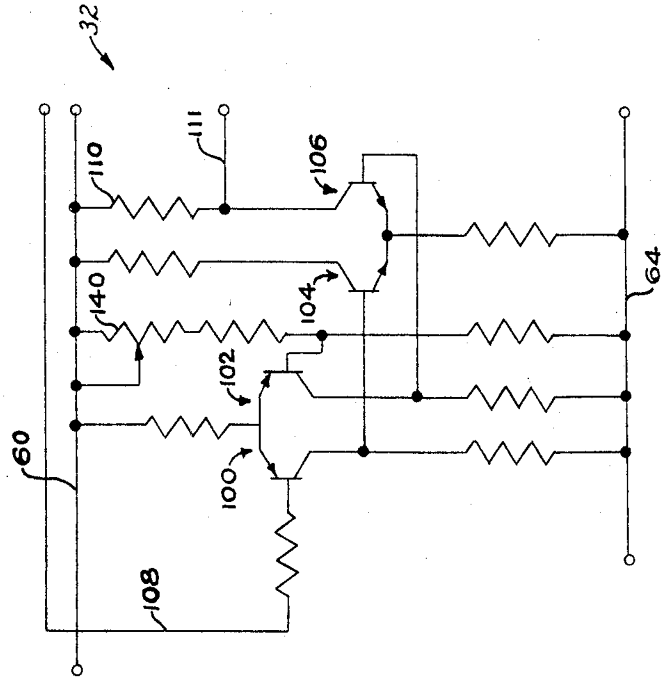
FIG. 4 is a schematic of the second difference amplifier.

A similar situation prevails in association with the second difference amplifier as reference to FIG. 4 will illustrate. In this case, transistors 100 and 102 correspond to transistors 56 and 58 respectively, whereas transistors 104 and 106 correspond to transistors 82 and 84 respectively. However, since the voltage across conductors 60 and 64 is stabilized, no reference voltage element is required, the stated stabilized voltage being used directly as a reference. Bias for the base electrode of transistor 100, on the other hand, is obtained from conductor 108 which extends to the third voltage output point (point B in FIGS. 1 or 5). Further, the collector-emitter circuits of the two transistors 104 and 106 are established directly across the conductors 60 and 64, resistor 110 corresponding to resistor 94 in FIG. 3.

Figure 5:
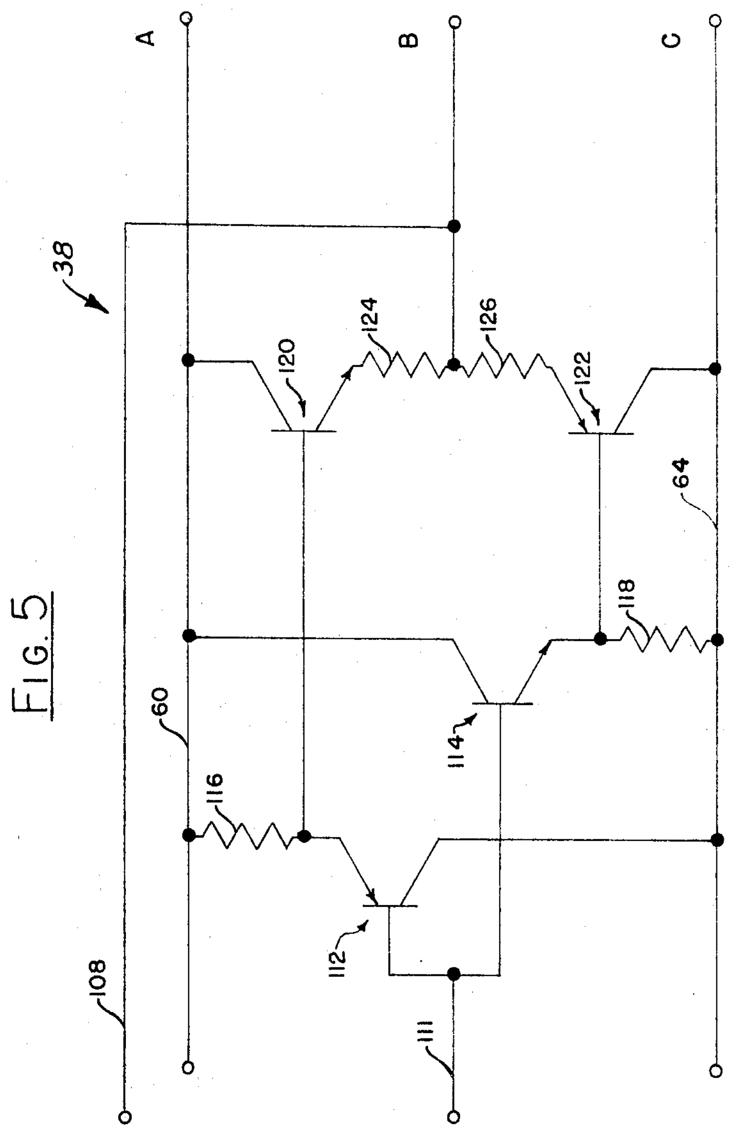
FIG. 5 is a schematic of a preferred embodiment of control means for the secondary supply.

The voltage drop across resistor 110 is used to provide an input for the control element 38 (FIG. 1). A preferred embodiment of this control element is illustrated in FIG. 5. The voltage input is applied through conductor 111 to a point common to the base electrodes of transistors 112 and 114. The emitter electrodes of these transistors are connected through resistors 116 and 118 to conductors 60 and 64 respectively and their collector electrodes are connected to the opposite of the conductors 60 or 64, as shown.

The potentials at the emitter electrodes of the two transistors 112 and 114 are used to bias transistors 120 and 122, connected in complementary symmetry across conductors 60 and 64, as shown. The emitter electrodes of transistors 120 and 122 are connected by the voltage divider chain 124, 126 and the junction point of these resistors is common with the third output point B. The use of voltage dividing resistors 124 and 126 permits the bias currents of the transistors 120 and 122 to be maintained within reasonable limits.

Bearing in mind the fact that the offset voltage between base and emitter of these transistors 120 and 122 will be the same, it will be appreciated that a difference in biasing potentials between their respective bases which is greater than the sum of their offset voltage must be employed. To achieve this end, the transistors 112 and 114 are chosen so as to have an offset voltage different from and greater than the offset voltages of transistors 120 and 122. Specifically, I prefer to use silicon transistors 112 and 114 and germanium transistors 120 and 122, the former having higher offset voltages as compared to the latter. For example, assuming an offset voltage of 0.5 v. for each of the transistors 112 and 114 and an offset voltage of 0.2 v. for each of the transistors 120 and 122, it will be obvious that since the bases of both transistors 112 and 114 are at the same potential, their respective emitter potentials will be $Vb+0.5$ v. and $Vb-0.5$ v., where $Vb$ is the base potential. These different voltages, when applied to the base electrodes of transistors 120 and 122 will establish potentials at their respective emitters of $Vb+0.3$ v. and $Vb-0.3$ v., in turn establishing a total potential difference of 0.6 v. across the resistor chain 124, 126.

It will be manifest that the value of output voltage at point B will depend upon the setting of variable resistor 140 (FIG. 4), and will be stabilized by the second difference amplifier 32 (FIG. 1) shown specifically in FIG. 4. Further, the voltage at point B may be varied between the values of the voltages of points A and C without varying such latter voltages. Similarly, the voltage difference between points A and C may be varied by manipulation of variable resistor 76 (FIG. 3) without disturbing the proportional value of the voltage at point B.

It is to be understood that certain changes and modifications as illustrated and described may be made without departing from the spirit of the invention or the scope of the following claims.

I claim:

1. A dual output power supply comprising, a full wave rectifier including terminals adapted for connection to a source and having a main output, control means for varying the voltage of said output, a source of fixed reference potential, differential amplifier means connected to said reference potential and to said output and to said control means and affecting said control means to establish the potential of said main output, second control means, said second control means being connected across said established main output to split the voltage thereof to provide a secondary output, and second differential amplifier means connected to said secondary output and to said established main output to establish the potential of said secondary output.

2. The power supply according to claim 1 additionally comprising a first potentiometer including a first resistor connected across the main output and a second potentiometer including a second resistor connected across the main output, each differential amplifier means including a control member which comprises a wiper terminal movable along a respective one of said first and second resistors to vary the voltage received by the respective differential amplifiers from the main output whereby the potential of the secondary output may be varied without affecting the main output and the main output may be varied without affecting the relative potential of the secondary output.

3. In a power supply, rectifier means having a filtered output and including input terminals adapted for connection to a source and an output circuit for delivering said output to a load, a first semiconductor having a base, an emitter and a collector and having its emitter-collector path in said output circuit, a second semiconductor having a base, an emitter and a collector and having its emitter-collector path connected across said output circuit and connected to the base of the first semiconductor, means connected to said rectifier means for obtaining an auxiliary potential greater than the potential of said output, a differential amplifier connected across said output circuit with said first semiconductor connected in the output circuit between said output and said differential amplifier and having an output connected through load means to said auxiliary potential, said output of the differential amplifier driving the base of said second semiconductor.

4. The system according to claim 3 wherein said filtered output comprises an LC circuit with the inductance of the LC circuit connected in said output circuit between said first semiconductor and said rectifier means and the capacitance of the LC circuit connected across said output circuit between said first semiconductor and said rectifier means, said means for obtaining an auxiliary potential comprising a diode and a capacitor connected in series across the output of the rectifier means with the auxiliary potential being available between said diode and capacitor.

5. A dual output power supply comprising, an unstabilized voltage supply, control means connected to said supply for establishing its output, said control means including a control element for regulating the output, means for providing reference potential, means for providing a potential proportional to said output, and a difference amplifier connected to said two last mentioned means and to said control element for controlling the latter to stabilize said output, second control means connected across said stabilized output to establish a secondary output, said second control means including a control element for regulating the secondary output, means for providing potential proportional to said stabilized output, and a difference amplifier connected to the last-mentioned means, to the secondary output and to the last-mentioned control element for controlling the same to stabilize the secondary output.

6. The system as defined in claim 5 wherein said means for providing a potential proportional to said outputs each comprise a potentiometer, said potentiometers each including a resistor connected across the stabilized output and a wiper which provides the potential and is movable along the resistor.

References Cited by the Examiner

UNITED STATES PATENTS

| | | | |
|---|---|---|---|
| 2,956,172 | 10/1960 | Torkildsen | 323—22 X |
| 2,963,637 | 12/1960 | Osborn | 323—22 |
| 2,981,884 | 4/1961 | Tighe | 323—22 |
| 3,046,469 | 7/1962 | Young | 323—22 |
| 3,089,962 | 5/1963 | Foote | 307—88.5 |
| 3,133,210 | 5/1964 | Leurgans | 307—88.5 |
| 3,175,211 | 3/1965 | Lee et al. | 340—347 |

FOREIGN PATENTS

| | | |
|---|---|---|
| 879,095 | 10/1961 | Great Britain. |

JOHN F. COUCH, *Primary Examiner.*

LLOYD McCOLLUM, *Examiner.*

J. M. THOMSON, W. E. RAY, *Assistant Examiners.*